United States Patent [19]

Chatelin

[11] Patent Number: 4,642,986

[45] Date of Patent: Feb. 17, 1987

[54] HYDRAULIC SERVO MOTOR

[76] Inventor: Jacques H. Chatelin, 53, rue Lamartine, Drancy (Seine Saint Denis), France

[21] Appl. No.: 568,234

[22] PCT Filed: Apr. 18, 1983

[86] PCT No.: PCT/FR83/00070

§ 371 Date: Dec. 13, 1983

§ 102(e) Date: Dec. 13, 1983

[87] PCT Pub. No.: WO83/03643

PCT Pub. Date: Oct. 27, 1983

[30] Foreign Application Priority Data

Apr. 19, 1982 [FR] France ................................ 82 06683

[51] Int. Cl.[4] ............................................... F16D 31/02

[52] U.S. Cl. ........................................ 60/474; 60/473; 91/459; 91/462

[58] Field of Search ................. 60/473, 474, 486, 392, 60/433, 368, 483; 91/361, 362, 459, 462, 465

[56] References Cited

U.S. PATENT DOCUMENTS 2,948,118 8/1960 Carlson, Jr. et al. ............. 60/474 X
3,954,046 5/1976 Stillhard ................................ 91/361
4,416,187 11/1983 Nyström Per H. G. ............. 91/361
4,437,385 3/1984 Kramer et al. ......................... 91/361

FOREIGN PATENT DOCUMENTS 2500096 7/1976 Fed. Rep. of Germany ........ 91/465
2082346 12/1971 France .
1340952 12/1973 United Kingdom .

*Primary Examiner*—Edward K. Look
*Attorney, Agent, or Firm*—Louis Orenbuch

[57] ABSTRACT

(a) Hydraulic servo motor comprising a jack (1, 14) intended to be connected by its rod ($3_1$, $3_2$, $15_1$) to a moving member to be displaced and accurately positioned, said jack being completely filled with liquid;

(b) Servo motor characterized in that the displacement of the piston (2) is implemented by direct liquid transfer from one chamber to the other chamber of the jack by at least one electric vibrator pump (6) supplied by an alternating current power source and in that a so-called electro valve (7), normally open when not in operation, is connected in order to make the two jack chambers communicate;

(c) The invention relates to hydraulic servo motors.

4 Claims, 4 Drawing Figures

HYDRAULIC SERVO MOTOR

This invention relates to a hydraulic servomotor in which movement is provided by the direct transfer of the liquid.

Developments in data processing have led to digital systems adapted to controlling industrial processes and capable of controlling a considerable number of analog control loops in order to control industrial production units of the boiler type, chemical or oil units, paper machines, cement works and so on.

This is done by replacing conventional control loops with improved optimization, but necessitates digital-/analog conversion for positioning the control valves, which are actuated by pneumatic servomotors and thus necessitate another electro-pneumatic conversion.

As compared with the prior art systems, the present invention relates to a hydraulic servomotor comprising a jack or actuator adapted to be connected by its rod to a movable component which is required to be accurately moved and positioned, the jack being completely filled with liquid, the servomotor being characterized in that the piston movement is provided by the direct transfer of liquid from one chamber of the actuator to the other via at least one electric vibrator pump powered by an a.c. supply and a safety solenoid valve, which is open in the inoperative state, is connected to connect the two chambers of the actuator.

According to another feature of the invention, the jack is a double-acting and double-rod jack.

According to another feature of the invention, a spring is disposed between the cylinder and the piston of the jack in order to tend to return the piston always towards one end of the cylinder.

According to another feature of the invention, a solenoid valve for reversing the direction of the movement is connected to connect the two chambers of the jack.

The invention is illustrated by way of example without any limiting force in the accompanying drawings wherein.

Figure 2:
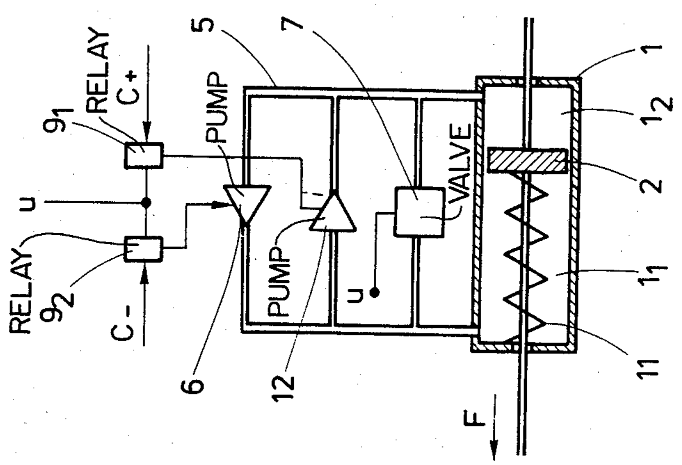
FIG. 2 is a variant of FIG. 1, the servomotor comprising two vibrator pumps.

The object of this invention is to provide a hydraulic servomotor providing a direct response to the orders from a process computer, without analog conversion or ancillary equipment, without the need for a pressure liquid supply system and with a low electrical power consumption, the time of which is limited to the duration of the servomotor control pulses.

Another object of the servomotor according to the invention is high accuracy of movement or positioning while the speed of the movement or the power is readily adjustable.

The reversal of the direction of the movement is also instantaneous without any dead zone and this results in the effect obtained being proportional to the control command.

The movement obtained is also perfectly linear while the available thrust is very considerable.

The servomotor is also of reduced size, weight and cost and highly reliable.

The servomotor according to the invention will be applied to the accurate and powerful movement or positioning of any controlled component, e.g. control valves, the tools of machine tools, and so on. According to the examplified embodiment shown in FIG. 1, the servomotor comprises a double-acting double-rod jack 1, the piston 2 being provided with two rods, $3_1$, $3_2$ of the same section intended for connection to the component which is to be controlled.

Since the rods $3_1$ and $3_2$ have identical sections, the chambers $1_1$ and $1_2$ defined by the piston 2 also have the same section and give an identical movement of the piston 2 in either direction for a given volume of fluid introduced via the end ports $4_1$, $4_2$ of the cylinder 1.

The ports $4_1$, $4_2$ are connected by the conduits 5 of a hydraulic circuit comprising in parallel: a vibrator pump 6, a solenoid valve 7 which is in the open position when no voltage is applied and a solenoid valve 8 which is in the closed position when no voltage is applied.

The vibrator pump 6 and the solenoid valve 8 are fed from the a.c. voltage U of the mains through reversing relays $9_1$, $9_2$, which are in turn controlled by the time pulses from a computer.

The solenoid valve 7, which is open when no voltage is applied, is supplied directly from the voltage U of the mains or any other supply system and is therefore normally closed.

The servomotor operates as follows:

In the inoperative state, the vibrator pump 6 and the solenoid valve 8 receive no power supply so that the pump 6 does not deliver to circuit 5, while solenoid valve 8 is closed.

Also, since voltage is applied to the solenoid valve 7 it is also closed.

When the computer delivers a control pulse C+ to relay $9_1$, the vibrator pump 6 receives voltage, the vibrations of this pump occuring during the period of the control pulse C+ at a frequency corresponding to the frequency of the mains voltage.

Since the volume displaced on each cycle of the pump is absolutely constant, the movement of the piston 2 of the cylinder is also strictly proportional to the duration of the control pulse C+.

On the other hand, when relay $9_2$ is energized by control pulse C−, pump 6 no longer receives power and the solenoid valve 8 receives power so as to connect the two parts $4_1$, $4_2$ via a calibrated port 10 forming a flow limiter.

The spring 11 disposed in the chamber $1_1$ of cylinder 1 and acting on the piston 2 then moves the piston in the opposite direction to arrow F at a speed which is regulated by the section of the calibrated port 10.

For this direction of movement of the piston 2 there is therefore also a linear movement absolutely proportional to the duration of the pulse C−, reversal of the direction of movement being without any inertia and no dead time, because either the vibrator pump 6 or the solenoid valve immediately receives power.

This accurate control of the piston 2 of the actuator is provided with minimum power consumption, power being used only during the times when the pump 6 or solenoid valve are actuated, the piston position being maintained outside this control period by the incompressibility of the liquid.

If the power supply voltage U is discontinued, the supply to the solenoid valve 7 is broken and it opens, so that the ports $4_1$ and $4_2$ are connected and the spring 11 moves the piston 2 in the opposite direction to arrow F as far as the end of the cylinder 1, which is equivalent to a safety position of the controlled component.

In the examplified embodiment shown in FIG. 2, the solenoid valve 8 has been replaced by a second vibrator pump 12 which is an inverted position with respect to pump 6.

In this case, one of the two pumps 6 or 12 is powered by the mains voltage U through the relays $9_1$ or $9_2$ depending upon the control pulse C+ or C− from the computer.

Figure 1:
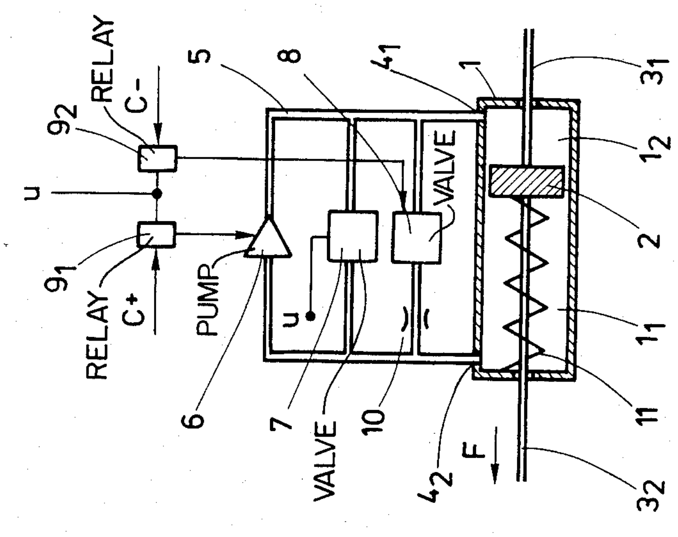
FIG. 1 is a diagram of a servomotor according to the invention having a single vibrator pump and a double-acting double-rod jack.

This therefore gives the same result as FIG. 1, each of the directions of movement of the piston 2 being produced by one of the two pumps 6 or 12.

Figure 3:
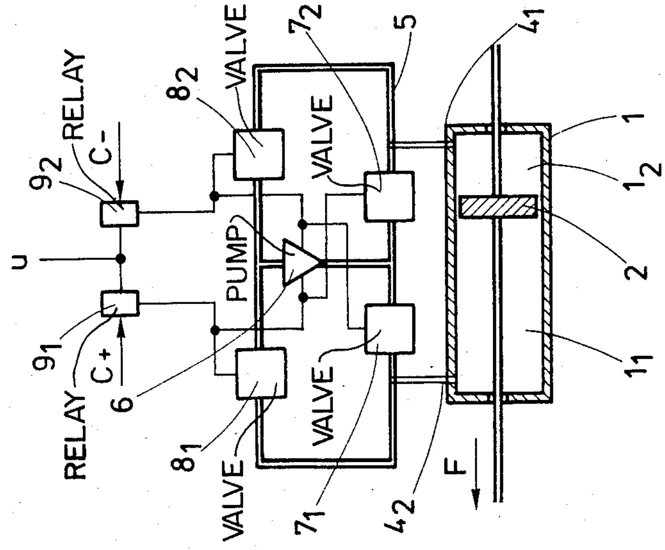
FIG. 3 is a servomotor in which the energization circuit is in the form of a closed bridge.

In the case shown in FIG. 3, circuit 5 comprises four solenoid valves $7_1$, $7_2$, $8_1$, $8_2$ which are closed when they are unenergized, i.e. when they are in the inoperative position.

In this case, and as shown in FIG. 3, the diagonal of the bridge is formed by the vibrator pump 6 and the chambers $1_1$ and $1_2$ of the actuator are isolated, the piston 2 being stationary.

When the computer feeds to relay $9_1$ a pulse adapted to move the piston 2 in the direction of arrow F, the relay energizes the diagonal solenoid valves $8_1$ and $7_2$ which open, and the vibrator pump 6.

The latter feeds liquid to the chamber $1_2$ of the actuator via the following circuit: chamber $1_1$, port $4_2$, solenoid valve $8_1$, pump 6, solenoid valve $7_2$ which is open since it is energized and port $4_1$.

When the computer feeds to relay $9_2$ a pulse requiring a reverse movement, the circuit is via solenoid valve $8_2$, pump 6 and solenoid valve $7_1$, which is open.

Figure 4:
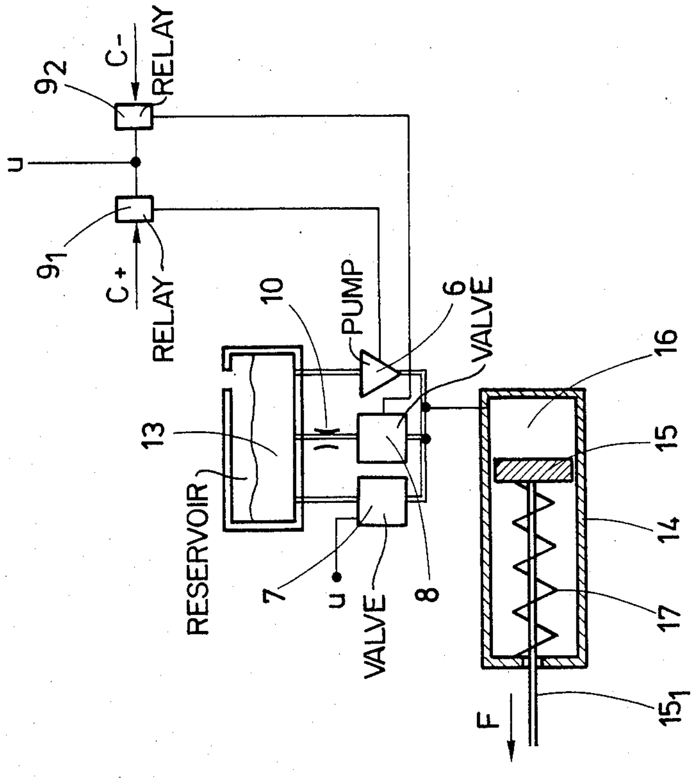
FIG. 4 is a servomotor with a single-acting jack.

In the examplified embodiment shown in FIG. 4, the fluid circuit is fed from a reservoir 13 and the servomotor actuator is a single-acting jack 14, the piston 15 of which has a single control rod $15_1$.

This actuator has a single compression chamber 16 defined by piston 15, while a spring 17 acts on piston 15 either to provide one of the directions of movement of the rod $15_1$ by applying voltage 2 and hence opening the solenoid valve 8, or return of rod $15_1$ to the safety position when the supply to the solenoid valve 7 is disconnected.

The operation of this embodiment is therefore identical to that shown in FIG. 1.

I claim:

1. A hydraulic servo motor comprising (i) a double acting jack having (a) a hollow cylinder closed off by end walls, the cylinder being adapted to be filled with a fluid, (b) a piston disposed in the cylinder and providing a movable partition wall therein whereby the cylinder is divided into two chambers, (c) piston rods extending from the opposed faces of the piston through the end walls of the cylinder, the rods being secured to the piston for movement therewith and those rods being adapted to be connected to a component for accurately controlling the movement and position of the component, (d) ports in the cylinder for enabling fluid transfer from each chamber to the other, (ii) a conduit interconnecting said ports for enabling fluid to flow between the chambers, (iii) an electric pump interposed in the conduit's fluid flow path for pumping fluid in one direction only, (iv) first means providing a first flow path bypassing the electric pump, (v) an electrically actuated safety valve disposed in the first bypass flow path, the valve being closed when electrically energized and preventing fluid from bypassing the electric pump through the first bypass flow path, the safety valve obtaining its electric power from the same source as the electric pump, (vi) resilient means urging the piston in the direction opposite that in which the piston is driven by the electric pump, the resilient means acting to oppose the fluid pressure exerted by the electric pump, (vii) second means providing a second flow path bypassing the electric pump, and (viii) electrically actuated means disposed in the second bypass flow path, the electrically actuated means providing an open bypass path for liquid flow when the means is electrically energized.

2. The hydraulic servo motor according to claim 1, wherein the electrically actuated means disposed in the second bypass flow path is an electrically controlled valve.

3. The hydraulic servo motor according to claim 2, further including (ix) means in the second bypass flow path providing a calibrated opening for regulating the rate of fluid flow through the second bypass flow path.

4. The hydraulic servo motor according to claim 1, wherein the electrically actuated means disposed in the second bypass flow path is a second electric pump arranged to pump fluid in the direction opposite to that of the first electric pump.

* * * * *